United States Patent
Fuji et al.

(10) Patent No.: US 12,416,540 B2
(45) Date of Patent: Sep. 16, 2025

(54) GAS DETECTION SYSTEM AND GAS DETECTION DEVICE

(71) Applicant: Tamron Co., Ltd., Saitama (JP)

(72) Inventors: Wataru Fuji, Saitama (JP); Akira Onoda, Saitama (JP); Terufusa Kunisada, Saitama (JP)

(73) Assignee: TAMRON CO., LTD., Saitama (JP)

( * ) Notice: Subject to any disclaimer, the term of this patent is extended or adjusted under 35 U.S.C. 154(b) by 322 days.

(21) Appl. No.: 18/130,253

(22) Filed: Apr. 3, 2023

(65) Prior Publication Data

US 2023/0384179 A1    Nov. 30, 2023

(30) Foreign Application Priority Data

May 24, 2022  (JP) .................. 2022-084788

(51) Int. Cl.
*G01M 3/04*    (2006.01)
(52) U.S. Cl.
CPC .................... *G01M 3/04* (2013.01)
(58) Field of Classification Search
CPC ........... G01M 3/04; G01M 3/002; G01M 3/38
See application file for complete search history.

(56) References Cited

U.S. PATENT DOCUMENTS

| | | | | |
|---|---|---|---|---|
| 5,867,264 A | * | 2/1999 | Hinnrichs | G01J 3/2846 |
| | | | | 356/330 |
| 2019/0212261 A1 | * | 7/2019 | Lannestedt | G01J 3/0208 |
| 2020/0309683 A1 | | 10/2020 | Imade | |

FOREIGN PATENT DOCUMENTS

| | | |
|---|---|---|
| JP | H06-288858 A | 10/1994 |
| JP | 2000-346796 A | 12/2000 |
| WO | WO 2019/064822 A1 | 4/2019 |

OTHER PUBLICATIONS

Hagen, Survey of autonomous gas leak detection and quantification with snapshot infrared spectral imaging, Journal of Optics, Sep. 22, 2020, pp. 1-18.

* cited by examiner

*Primary Examiner* — Timothy P Graves
(74) *Attorney, Agent, or Firm* — Paratus Law Group, PLLC

(57) ABSTRACT

A gas detection device includes a gas detection system configured to image while irradiating, in a dot array shape, infrared light having an absorption wavelength of a gas from a light source, and generates, with a CPU, information on an emphasis image of an image of the gas from image information when irradiating and image information when not irradiating, and a display unit.

6 Claims, 3 Drawing Sheets

GAS DETECTION SYSTEM AND GAS DETECTION DEVICE

CROSS-REFERENCE TO RELATED APPLICATIONS

This application is based on and claims the benefit of priority from Japanese Patent Application No. 2022-084788, filed on May 24, 2022, the entire contents of which are incorporated herein by reference.

BACKGROUND OF THE INVENTION

Technical Field

The present invention relates to a gas detection system and a gas detection device.

Related Art

Carbon neutral 2050 (net-zero GHG emissions by 2050) has been declared in reaction to a large-scale disaster caused by abnormal weather in recent years, and there is a rapid demand for reduction of greenhouse gas. Examples of the greenhouse gas include, in addition to carbon dioxide ($CO_2$), sulfur hexafluoride (SFe) gas sealed in transformers, and various refrigerant gases used in refrigeration equipment. Sulfur hexafluoride gas and refrigerant gases are reported to have a greenhouse effect several times to nearly 30,000 times that of carbon dioxide ($CO_2$).

In recent years, mixed combustion power generation or mono-fuel combustion power generation in thermal power plants such as methane gas ($CH_4$) and ammonia gas ($NH_3$) have been developed as energy conversion gases replacing fossil fuels.

The energy conversion gas and the greenhouse gas have a large influence on the surrounding environment due to leakage. Therefore, there is a demand for a system for detecting gas leakage. As a gas detection system, a technique using an infrared camera is known.

As a gas detection system using an infrared camera, a method of two-dimensionally scanning a laser point light source that is an infrared light source using a galvanometer mirror (see, for example, JP 2000-346796 A) and a method of transmitting a laser that is an infrared light source through a diffusion lens and two-dimensionally and uniformly illuminating with the laser (see, for example, JP 6-288858 A) are known.

As a gas detection system using an infrared camera, a method of displaying an image of a passive type gas cloud with background radiation light as a light source to be superimposed on an image by a visible light camera (see, for example, WO 2019/064822) and a method of detecting, using a snapshot type detector, an image of a passive type gas cloud with background radiation light as a light source (see, for example, Nathan Hagen, "Survey of autonomous gas leak detection and quantification with snapshot infrared spectral imaging", J. Opt. 22 (2020), p. 1-18, 2020) are known.

However, the conventional techniques as described above have various practical problems. For example, in the method described in JP 2000-346796 A, since the laser point light source is scanned two-dimensionally with a galvanometer mirror, it is difficult to improve durability due to presence of such a movable portion. Since both the methods described in WO 2019/064822 and Nathan Hagen, "Survey of autonomous gas leak detection and quantification with snapshot infrared spectral imaging", J. Opt. 22 (2020), p. 1-18, 2020) detect gas using a passive type image, the detection sensitivity is susceptible to ambient temperature, wind, or other gases. While the method described in JP 6-288858 A is configured to be switchable between imaging of an active type image and imaging of a passive type image, the method is susceptible to a surrounding environment, similarly to WO 2019/064822 and JP 2000-346796 A) described above. As described above, the conventional techniques have room for examination from the viewpoint of improving durability and reducing the influence of the surrounding environment on the detection result.

An object of one aspect of the present invention is to provide a technique that has high durability and achieves gas detection less susceptible to a surrounding environment.

SUMMARY OF THE INVENTION

In order to solve the above problem, a gas detection system according to one aspect of the present invention includes: an infrared image sensor configured to image an imaging target region in which gas may be leaking; a light source configured to irradiate the imaging target region with infrared light including an absorption wavelength of the gas; an optical system configured to condense infrared light from the light source on a light receiving surface of the infrared image sensor; and an image information processing unit configured to acquire information on an image of the imaging target region irradiated with the infrared light from the light source and information on an image of the imaging target region not irradiated with the infrared light from the light source, and generate information on an emphasis image in which an image of the gas in the image is emphasized with reference to the information on the image having been acquired.

In order to solve the above problem, a gas detection device according to one aspect of the present invention includes the gas detection system described above, and a display unit configured to display the emphasis image or a transmission unit for transmitting information on the emphasis image.

According to one aspect of the present invention, it is possible to provide a technique that has high durability and achieves gas detection less susceptible to a surrounding environment.

DESCRIPTION OF THE EMBODIMENTS

First Embodiment

Figure 1:
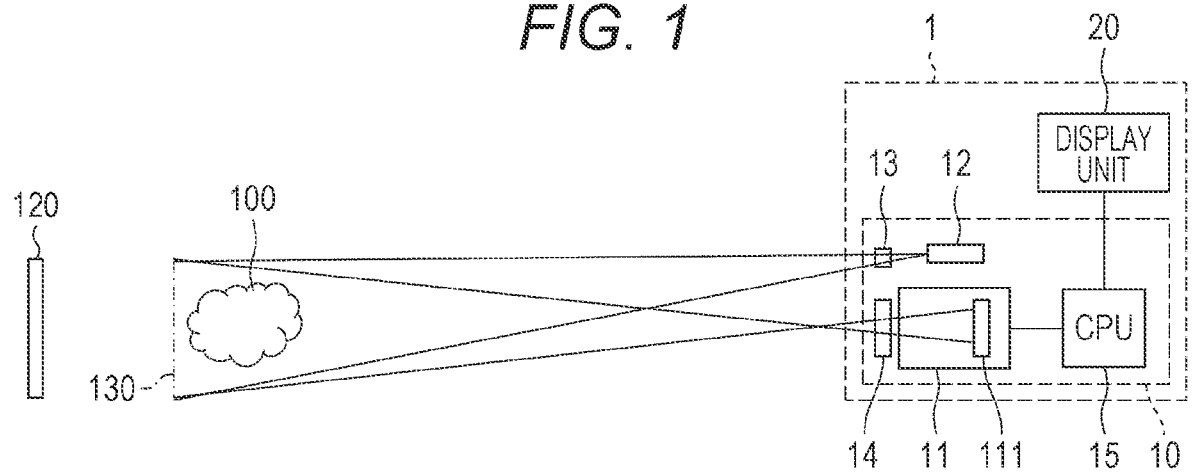
FIG. 1 is a view schematically showing a configuration of a gas detection device according to a first embodiment of the present invention.

Embodiments of the present invention will be described below in detail. FIG. 1 is a view schematically showing the configuration of the gas detection device according to the first embodiment of the present invention. As shown in FIG. 1, a gas detection device 1 includes a gas detection system 10 and a display unit 20. The gas detection device 1 is a portable device, and is configured such that, for example, a worker can check the display unit 20 while holding the gas detection device 1.

The gas detection device 1 is a device configured to detect a gas 100, which is a detection target. Usually, the gas has an absorption wavelength unique to the gaseous species in the infrared region. Examples of such a gas and its absorption wavelength include carbon dioxide (4.26 μm), carbon monoxide (4.7 μm), methane (3.3 μm), ammonia (10 μm to 11 μm), sulfur hexafluoride (10.6 μm), and a refrigerant gas (8 μm to 9.5 μm) of a fluorine compound containing chlorofluorocarbon or the like. The gas 100 includes a gas having an absorption wavelength unique to the infrared region as described above. The gas detection device 1 detects the gas 100 as an image of the gas 100 in an imaging target region 130. A signal detected by the gas detection device 1 includes a signal of light of a background radiation light source 120. Examples of light of the background radiation light source 120 include backscattered light from aerosol and fine particles in the atmosphere, reflected light from a structural object existing in the background or surroundings of the gas leakage point, and radiation light. The background radiation light source 120 virtually shows a light source of these various types of light.

Gas Detection System

The gas detection system 10 includes an infrared camera 11, a light source 12, an illumination optical system 13, a condensing optical system 14, and a CPU 15.

The infrared camera 11 is a device configured to image an imaging target region in which gas may be leaking, and includes an infrared image sensor 111, which is a light receiving element configured to image the imaging target region. As the infrared image sensor 111, a known infrared image sensor according to the absorption wavelength of the detection target gas can be adopted.

The light source 12 is a device configured to irradiate the imaging target region 130 with infrared light including an absorption wavelength of gas. As the light source 12, an infrared laser capable of emitting monochromatic infrared light in an infrared region (780 nm to 16 μm) can be adopted. In the present embodiment, the light source 12 is a pulse light source. Examples of pulse light sources include quantum cascade lasers (QCL) and light emitting diodes (LED).

The illumination optical system 13 is arranged on an optical path of the emission light from the light source 12 to the imaging target region 130, and has an optical configuration for controlling traveling of the infrared light emitted from the light source 12. The illumination optical system 13 is configured to condense, in a dot array shape, the infrared light emitted from light source 12 on the imaging target region 130. More specifically, the illumination optical system 13 is a meta-surface.

The meta-surface is an optical element in which a large number of dielectric columnar structures called "meta-atoms" are arrayed on the surface. A meta-lens is configured by arranging a large number of the above-described meta-atoms on the surface of a glass plate. The meta-lens controls the refractive index of a substance by a microstructure. The meta-lens diffuses the transmitted infrared light so as to condense in a dot array shape in the imaging target region 130 by the Mie resonance phenomenon by a structure having the sub-wavelength size smaller than the incident wavelength. The meta-surface in the present embodiment is also called a meta-lens because infrared light is condensed in a specific pattern as described above. The image of transmitted light of the meta-lens can be appropriately set according to the size and arrangement of the structure, and the meta-lens condenses, in a dot array shape, the emitted light of the light source 12 in the imaging target region 130 in such a manner. The arrangement of the dots in the dot array can be appropriately determined according to the angle of view. The angle of view can be determined according to the sensor size in the infrared image sensor 111 and the focal length of the condensing optical system 14. The dots can be set so as to be evenly arranged in the imaging target region 130 at a density with which the outer edge of the gas 100 in the imaging target region 130 can be specified, for example.

The sub-wavelength structure in the meta-lens (meta-surface) can be manufactured by one-time lithography and etching. The meta-lens also has superiority in terms of manufacturing as described above. The meta-lens can have high functionality that conventional lenses cannot have, such as a polarization separation function.

Adopting the meta-lens for the control of the refractive index achieves significant thickness reduction and weight reduction as compared with the case where a refractive lens controls the refractive index. As compared with a conventional thin lens such as a Fresnel lens and diffraction lenses, the meta-lens can suppress a decrease in performance with respect to obliquely incident light and can increase a deflection angle (bending angle) of emitted light.

The condensing optical system 14 is an optical element for condensing light from the imaging target region 130 onto the infrared image sensor 111 to form an image. The condensing optical system 14 may be, for example, an infrared zoom lens. The condensing optical system 14 is compatible with infrared light emitted from the light source 12.

As described above, in the present embodiment, the meta-lens of the illumination optical system 13 and the infrared zoom lens of the condensing optical system constitute an optical system configured to condense the infrared light from the light source 12 so as to form image with a dot array shape on the light receiving surface of the infrared image sensor 111.

The CPU 15 is an image information processing unit configured to generate information on an emphasis image of an image of the gas 100 in the imaging target region 130. For example, the CPU 15 includes, as a functional configuration, an image information acquisition unit configured to acquire information on an image of the imaging target region 130 irradiated with infrared light from the light source 12 and information on an image of the imaging target region 130 not irradiated with infrared light from the light source 12, an image information generation unit configured to generate information on an emphasis image in which an image of the gas 100 in the image of the imaging target region 130 is emphasized with reference to information on the acquired images, and an output unit configured to output information on the emphasis image having been generated.

Display Unit

The display unit 20 is a device that displays the emphasis image according to information on the emphasis image generated by the CPU 15. The display unit 20 is, for example, a liquid crystal display device.

Description of Image Information

Figure 2:
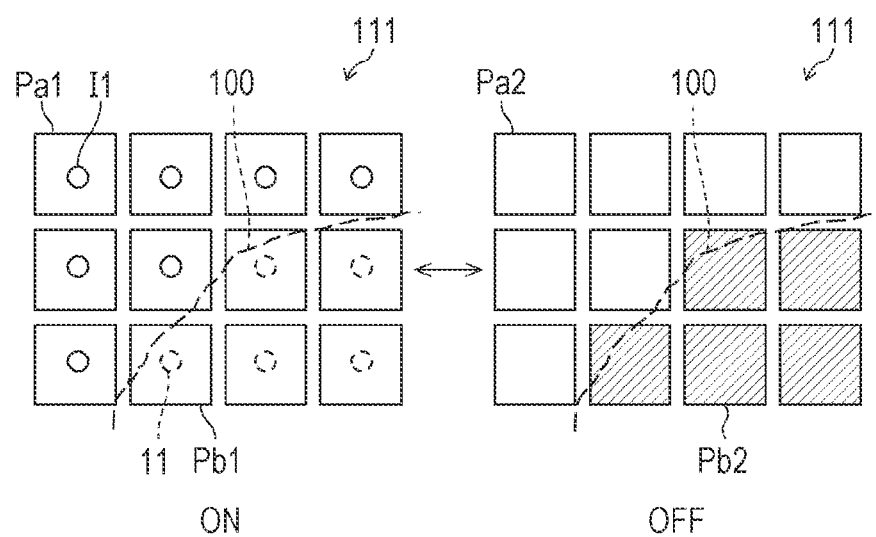
FIG. 2 is a schematic view for describing a state of light reception by an infrared image sensor when infrared light is irradiated and a state of light reception by an infrared image sensor when infrared light is not irradiated in the first embodiment of the present invention.

Acquisition of image information in the gas detection system 10 will be described. FIG. 2 is a schematic view for describing a state of light reception by the infrared image sensor when infrared light is irradiated and a state of light reception by the infrared image sensor when infrared light is not irradiated in the first embodiment of the present invention. The left view in FIG. 2 schematically shows the light receiving surface of the infrared image sensor 111 when infrared light is irradiated, and the right view in FIG. 2 schematically shows the light receiving surface of the infrared image sensor 111 when infrared light is not irradiated. FIG. 2 shows a boundary of the image of the gas 100 on the light receiving surface. A large number of photoelectric conversion elements are arrayed on the light receiving surface of the infrared image sensor 111, and there are photoelectric conversion elements (Pa1 and Pa2) positioned outside the gas 100 and photoelectric conversion elements (Pb1 and Pb2) positioned inside the gas 100.

The infrared light irradiated from the pulse light source that is the light source 12 is condensed in a dot array shape in the imaging target region 130. Assume it is set that the dot array is positioned at positions corresponding to all the photoelectric conversion elements on the light receiving surface of the infrared image sensor 111.

Since the infrared light emitted from the light source 12 includes the absorption wavelength of the gas 100, the dot-shaped infrared light with which the gas 100 is irradiated among the infrared light in a dot array shape by the infrared light from the light source 12 is absorbed by the gas 100. Therefore, the photoelectric conversion element Pa1 outside the gas 100 detects dot-shaped infrared light, and the photoelectric conversion element Pb1 inside the gas 100 detects dot-shaped infrared light that has been absorbed by the gas 100 and attenuated in light intensity. Hence, when the pulse light source emits infrared light, the infrared image sensor 111 more strongly detects the dot-shaped infrared light outside the gas 100, and more weakly detects the dot-shaped infrared light inside the gas 100.

The detected image is an image according to the strength of the detection of the dots, and is low in resolution because it is a dot image, but is high in contrast because it is an image by the irradiated infrared light. The image at this time is also called an "active image".

On the other hand, the gas 100 also absorbs light having an absorption wavelength in the background radiation light. Therefore, when the pulse light source does not emit infrared light, the infrared image sensor 111 detects an image in which light having an absorption wavelength of the gas is absorbed by the gas 100 in the background radiation light source 120. For this reason, when the pulse light source does not emit infrared light, as shown in the right view of FIG. 2, the photoelectric conversion element Pa2 outside the gas 100 detects background radiation light including the infrared light, and the photoelectric conversion element Pb2 inside the gas 100 detects background radiation light in which the infrared light has been absorbed. Therefore, when the pulse light source does not emit infrared light, the infrared image sensor 111 strongly detects the infrared light in the background radiation light outside the gas 100 and more weakly detects the infrared light inside the gas 100.

Since the detected image is an image obtained by photographing the imaging target region as it is, the resolution is high, but the contrast is usually low because the image is easily affected by disturbance and background radiation light. The image at this time is also called a "passive image".

Image Generation Example

Figure 3:
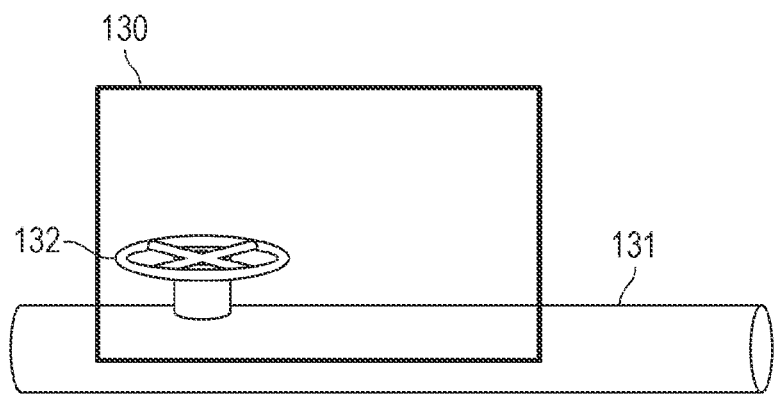
FIG. 3 is a view schematically showing an example of an imaging target region in the first embodiment of the present invention.

Generation of information on an emphasis image in the present embodiment will be described. FIG. 3 is a view schematically showing an example of the imaging target region in the first embodiment of the present invention. The imaging target region 130 is a region including a pipe 131 and a valve 132 for opening and closing the pipe. FIG. 3 is, for example, a visible light image, and even if gas leaks from the valve 132, it is not apparent at a glance. The gas detection device 1 images this imaging target region 130. At this time, the light source 12 is directed to an area to be imaged coaxially with or at the same angle of view of the infrared image sensor 111, and the imaging target region 130 is irradiated with infrared light having a wavelength matching the absorption wavelength of the gas 100.

Figure 4:
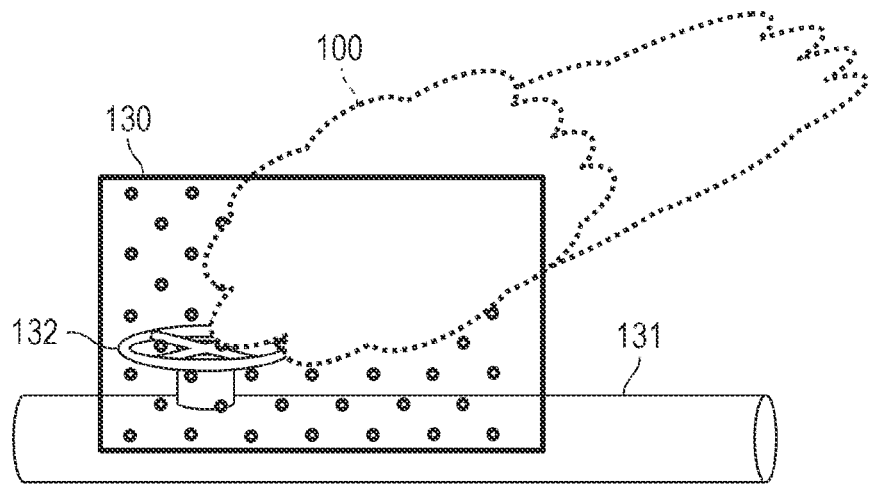
FIG. 4 is a view schematically showing an example of an active image of a dot array in an imaging target region generated in the first embodiment of the present invention.

FIG. 4 is a view schematically showing an example of an active image of a dot array in the imaging target region generated in the first embodiment of the present invention. When the gas detection device 1 images the imaging target region 130, when infrared light is emitted from the pulse light source, the image information acquisition unit of the CPU 15 acquires information on a dot image that is weaker in the part of the gas 100 and stronger outside the gas 100 as shown in FIG. 4.

Figure 5:
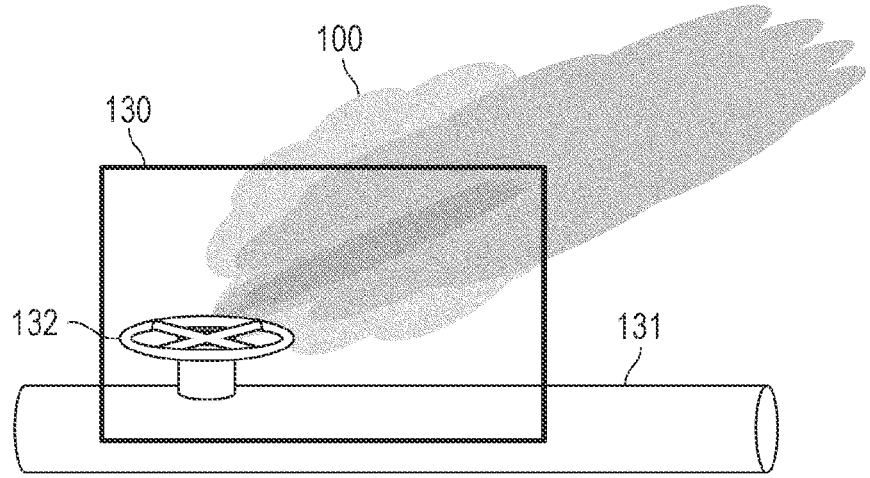
FIG. 5 is a view schematically showing an example of a passive image of an imaging target region generated in the first embodiment of the present invention.

FIG. 5 is a view schematically showing an example of a passive image of the imaging target region generated in the first embodiment of the present invention. When infrared light is not irradiated from the pulse light source, the image information acquisition unit of the CPU 15 acquires information on a darker image in the part of the gas 100 and a brighter image outside the gas 100 as shown in FIG. 5. In the passive image, a part where the gas is thicker becomes darker.

Figure 6:
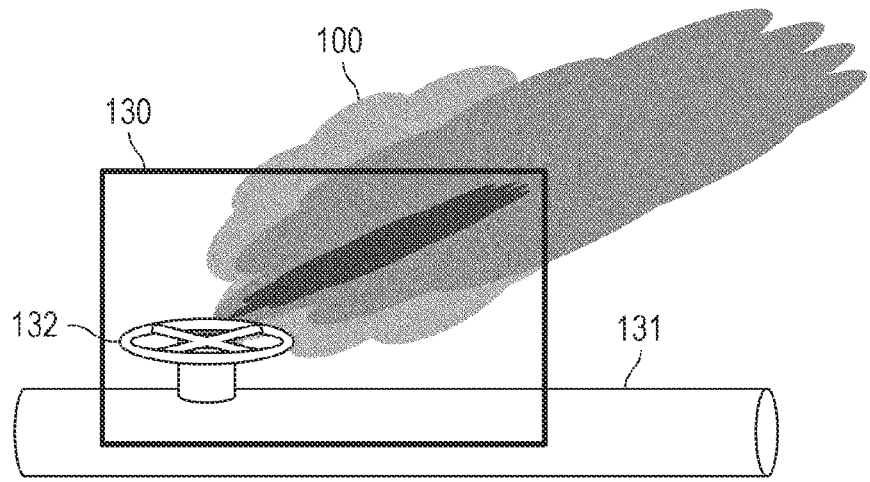
FIG. 6 is a view schematically showing an example of an emphasis image of an imaging target region generated in the first embodiment of the present invention.

FIG. 6 is a view schematically showing an example of an emphasis image of an imaging target region generated in the first embodiment of the present invention. The image information generation unit of the CPU 15 acquires the information on the active image as shown in FIG. 4 and the information on the passive image as shown in FIG. 5, and creates information on an emphasis image in which the image of the gas 100 is emphasized with reference to these pieces of information. For example, the image information generation unit obtains a ratio of signal values for each pixel of the active image and the passive image acquired by the image information acquisition unit, and determines the presence or absence of the gas 100 in the pixel according to a threshold value of the ratio having been set in advance.

Due to this, the outer edge of the gas 100 is clearly shown in the emphasis image. The image information generation unit adds information on a specific color to pixels equal to or larger than a threshold value such that, for example, the part of the gas 100 is displayed in a specific color in the emphasis image. Due to this, the gas 100 is shown in a more emphasized manner in the emphasis image. Furthermore, the image information generation unit estimates that the concentration of the gas 100 is higher as the ratio is higher on the basis of the magnitude of the ratio, and adds information on a specific color corresponding to this, for example. The image information generation unit estimates motion of the gas 100 from the magnitude of the fluctuation in the magnitude of the ratio between adjacent pixels on the basis of the magnitude of the ratio, and adds information on an image (arrow or the like) corresponding to this, for example. Due to this, the motion of the gas 100 is shown in a more emphasized manner in the emphasis image.

The CPU 15 can add, to an image of the image information to be generated, information in a depth direction other than the vertical direction and the horizontal direction in the image. The addition of information in the depth direction can be achieved by further superimposing a color-coded image on the distribution of distance in the screen, for example. In the addition of the information in the depth direction, the correspondence relationship between the color and the distance may be displayed by a scale bar. If the display unit 20 is a touchscreen, a distance (information in the depth direction) at a position designated by an operator of the touchscreen with a pen tablet or the like may be displayed in overlay with a numerical value.

The CPU 15 may estimate the distance using a classifier that has learned the distance in advance. For example, the CPU 15 may estimate the distance using a technique as described in a document "RANFTL, Rene et. Al., "Vision Transformers for Dense Prediction", 2021 IEEE/CVF International Conference on Computer Vision, 2021, p. 12159-12168". The distance information obtained by this technique is a relative distance. Therefore, it is preferable to calibrate the distance before the measurement from the viewpoint of reflecting the estimation result of the distance in the image described above.

As another method, a mark may be projected for each distance, and the distance may be estimated from the focus of the mark and the degree of its deviation. When in focus, the histogram in the mark region becomes sharp, but as becoming out of focus, the histogram has a deformed and broad shape. This method allows the distance to be estimated on the basis of the correlation between the half-value width of the histogram of the mark region and the deviation amount of the distance in focus. For example, a table of the deviation amount between the half-value width of the histogram and the distance in focus is created in advance, and a distance distribution view is created. The half-value width of the histogram alone does not indicate whether the marker is farther from or closer to the camera than a marker in focus. On the other hand, when the distance is close to the camera, the projection image becomes large, and the projection image far from the camera becomes a small projection image. This makes it possible to measure the distribution of the distance between the camera and the projection image.

The CPU 15 transmits, to the display unit 20, the information on the emphasis image generated by the image information generation unit. The display unit 20 displays the emphasis image as shown in FIG. 6 according to the information.

Main Actions and Effects

The gas detection device 1 of the present embodiment can be used as a gas cloud detection camera system for the purpose of detecting a specific gas such as a combustible gas and a greenhouse gas leaking into the atmosphere.

In the gas detection device 1, the CPU 15 acquires information on an active image and information on a passive image, and creates information on the emphasis image by referring to those pieces of information. The emphasis image includes features (advantages) of both active and passive images. Then, by performing emphasis processing of emphasizing a gas image on the basis of the acquired active image and passive image, it is possible to detect gas leakage from attenuation of infrared light. Therefore, the gas detection device 1 can achieve gas detection that is less susceptible to a surrounding environment than a conventional detection method such as a method using a passive type gas detection camera, and a highly sensitive gas cloud detection device is achieved.

The gas detection device 1 includes a meta-lens (meta-surface) as an optical element for irradiating a dot array. This enables the light source 12 to be made smaller compared with a case where the entire imaging target region is irradiated with infrared light. Hence, the gas detection device 1 is advantageous from the viewpoint of downsizing.

In the present embodiment, the illumination optical system 13 includes a meta-lens. The meta-lens exhibits a function of condensing and diffusing light as an optical element at a height of half a wavelength. This makes it possible to reduce the thickness and weight to about a fraction to several $1/100$ of those of the conventional refractive lenses or Fresnel lens. Use of the meta-lens for the optical system makes it possible to increase the gas detection limit as compared with a case of use of a diffractive optical element for the optical system.

Furthermore, use of the meta-lens for the illumination optical system 13 makes it possible to increase energy use efficiency of light as compared with a case where the imaging target region 130 is uniformly irradiated with infrared light. Therefore, even a light source having a smaller output than that in the above case can illuminate a longer distance. In the present embodiment, the range of the dots to be irradiated is within a range of the angle of view of imaging by the infrared image sensor 111, but can function even if the range is out of the range.

Use of the meta-lens for the illumination optical system 13 enhances the durability of the gas detection device 1 because the imaging time is short and a movable part is not included, as compared with a case where two-dimensional scanning is performed with a point light source as in the conventional techniques.

In the present embodiment, the light source 12 emits infrared light including an absorption wavelength of gas using a pulse light source. Therefore, it is possible to substantially simultaneously acquire information on an active image and information on a passive image, and it is possible to detect a clear position of the gas 100 in a short time. Therefore, it is possible to achieve detection of the gas 100 with high sensitivity.

The light source 12 emits infrared light including an absorption wavelength of the gas. In the present embodiment, when the vicinity of the leakage point of the gas 100 is irradiated with an electromagnetic wave having a wavelength easily absorbed by the gas 100, the irradiated electromagnetic wave is absorbed by the gas 100 and a principle of attenuation is applied. Therefore, it is possible to reduce the influence of other gases different from the detection target gas 100 such as water vapor, and it is possible to detect the gas 100 with higher sensitivity than ever.

MODIFIED EXAMPLE

The optical system in the present embodiment may use a diffractive optical element in place of the meta-lens. Both the meta-lens and the diffractive optical element can be appropriately designed on the basis of the transmission efficiency required for the optical system, the viewing angle of the infrared image sensor 111, the number of pixels of the infrared image sensor 111, and the absorption wavelength of the detection target gas. Which one of the meta-lens and the diffractive optical element to use may be appropriately decided on the basis of these requirements. The diffractive optical element exhibits a function of condensing and diffusing light as an optical element when the maximum height of the unevenness is twice or less the wavelength of the incident electromagnetic wave. Therefore, even if the diffractive optical element is used, it is advantageous for reducing the thickness of the optical system and the weight of the gas detection device as compared with the conventional refractive lenses or Fresnel lens.

The optical system in the present embodiment is only required to have an optical configuration to condense infrared light from the light source 12 so as to form an image with a dot array shape on the light receiving surface of the infrared image sensor 111. Therefore, the meta-lens or the diffractive optical element may be arranged not in the illumination optical system 13 but in the condensing optical system 14, that is, on the optical path of incident light to the infrared image sensor 111. Alternatively, the meta-lens or the diffractive optical element may be included in both the illumination optical system 13 and the condensing optical system 14.

The display unit 20 may further include a touchscreen, and may further include a function as an input unit of the gas detection system.

In generation of an emphasis image, the CPU 15 may generate the emphasis image by determining the outer edge of the gas 100 in the emphasis image from the ratio of pixels between the active image and the passive image, and multiplying the signal value of the passive image corresponding to the inside of the outer edge by a constant. Alternatively, in generation of the emphasis image, the CPU 15 may determine the outer edge of the gas 100 from the active image and generate an image of the gas 100 from the passive image.

Second Embodiment

Other embodiments of the present invention will be described below. For convenience of description, in the following embodiments, members having the same functions as the members described in the above embodiment are denoted by the same reference numerals, and the description thereof will not be repeated.

The gas detection device of the present embodiment has the same configuration as that of the first embodiment described above except that a continuous wave light source configured to generate a continuous wave of infrared light is used as the light source 12 in place of the pulse light source. Examples of the continuous wave light source include quantum cascade lasers and LEDs. In the present embodiment, the CPU 15 acquires information on an image and generates information on an emphasis image similarly to the above-described first embodiment except that the method of acquiring information on the active image and information on the passive image is different.

Figure 7:
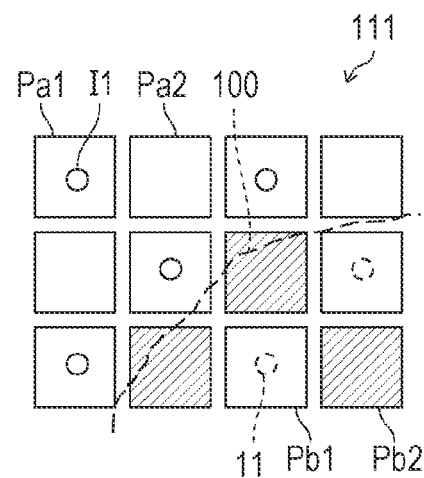
FIG. 7 is a schematic view for describing a state of light reception by an infrared image sensor when infrared light is irradiated in a second embodiment of the present invention.

FIG. 7 is a schematic view for describing a state of light reception by the infrared image sensor when infrared light is irradiated in the second embodiment of the present invention. The photoelectric conversion elements arrayed on the light receiving surface of the infrared image sensor 111 have geometric regularity, and are set as, for example, a first group of photoelectric conversion elements arranged at a position of a first color of a checkered pattern and a second group of photoelectric conversion elements arranged at a position of a second color of a checkered pattern. The first group of photoelectric conversion elements are photoelectric conversion elements configured to receive infrared light in a dot array shape by a meta-lens, and the second group of photoelectric conversion elements are photoelectric conversion elements configured to receive light in a part other than the infrared light in the dot array shape by the meta-lens.

The first group of photoelectric conversion elements Pa1 outside the gas 100 detect dot-shaped infrared light, and the first group of photoelectric conversion elements Pb1 inside the gas 100 detect dot-shaped infrared light absorbed by the gas 100. Therefore, similarly to the first embodiment, the infrared image sensor 111 images an active image in the region of a geometric first arrangement on the light receiving surface.

The second group of photoelectric conversion elements Pa2 outside the gas 100 detect infrared light in a region other than the dot shape, that is, infrared light in background radiation light, and the second group of photoelectric conversion elements Pb2 inside the gas 100 detect infrared light in the background radiation light absorbed by the gas 100. Therefore, similarly to the first embodiment, the infrared image sensor 111 images a passive image in the region of a geometric second arrangement on the light receiving surface. In a case of obtaining the ratio of the signal values in generation of an emphasis image, the ratio of the signal values is only required to be obtained between the photoelectric conversion element Pa1 and the photoelectric conversion element Pa2 and between the photoelectric conversion element Pb1 and the photoelectric conversion element Pb2 in a predetermined correspondence relationship such as being adjacent to each other.

According to the present embodiment, the resolution of the active image and the passive image is reduced due to the predetermined geometric arrangement as compared with the first embodiment described above, but information on the active image and the passive image is simultaneously acquired. As described above, in the present embodiment, it is possible to simultaneously acquire the information on the active image and the information on the passive image and generate an emphasis image according to the difference in space.

Third Embodiment

Figure 8:
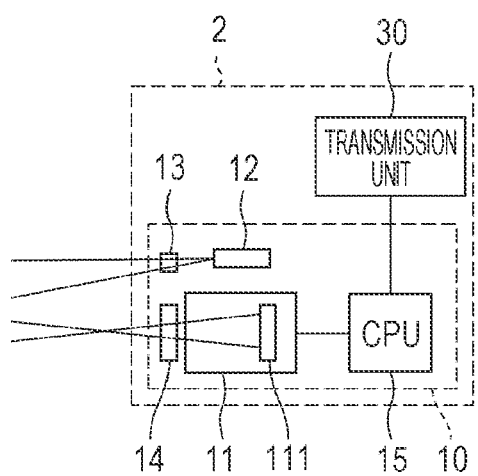
FIG. 8 is a view schematically showing a configuration of a gas detection device according to a third embodiment of the present invention.

FIG. 8 is a view schematically showing the configuration of the gas detection device according to the third embodiment of the present invention. As shown in FIG. 8, a gas detection device 2 has the same configuration as that of the gas detection device 1 of the first embodiment described above except that the gas detection device 2 includes a transmission unit 30 in place of the display unit 20. The gas detection device 2 is a device that can be mounted on a moving body, and is configured to be mounted on an unmanned aerial vehicle such as a drone, for example, and to transmit an acquired image to a worker who is waiting in a separated place. As the transmission unit 30, a known apparatus capable of wirelessly transmitting information on the acquired image can be adopted.

According to the present embodiment, gas detection similar to that in the first embodiment can be performed even at a high place or a place where entry of a worker is restricted. Since gas can be detected even in an unmanned state, it is also applicable to an automatic gas detection system.

Implementation Example by Software

The function of the CPU 15 (hereinafter, referred to as "device") can be achieved by a program for causing a computer to function as the device, the program for causing the computer to function as each control block (the above-described image information acquisition unit, image information generation unit, and the like) of the device.

In this case, the device includes a computer having at least one control device (for example, processor) and at least one storage device (for example, memory) as hardware for executing the program. By the control device and the storage device executing the program, the functions described in the above embodiments are achieved.

The program may be recorded in one or a plurality of non-transitory, computer-readable recording media. The recording media may be or need not be included in the device. In the latter case, the program may be supplied to the device via any wired or wireless transmission medium.

Some or all of the functions of the control blocks can be achieved by a logic circuit. For example, an integrated circuit in which a logic circuit functioning as the control blocks is formed is also included in the scope of the present invention. In addition to this, for example, the functions of the control blocks can be achieved by a quantum computer.

Each processing described in each of the above embodiments may be executed by artificial intelligence (AI). For example, in the above embodiments, AI may be caused to execute determination of conditions of the optical system at the time of imaging and generation of information on an emphasis image. In this case, AI may operate in the control device, or may operate in another device (for example, edge computer, cloud server, or the like).

The present invention is not limited to the above-described embodiments, and various modifications can be made within the scope indicated in the claims. Embodiments obtained by appropriately combining technical means disclosed in different embodiments are also included in the technical scope of the present invention.

SUMMARY

As clear from the above description, the gas detection system (10) according to a first aspect of the present invention includes: the infrared image sensor (111) configured to image the imaging target region (130) in which gas may be leaking; the light source (12) configured to irradiate the imaging target region with infrared light including an absorption wavelength of the gas; the optical system (illumination optical system 13) configured to condense infrared light from the light source on a light receiving surface of the infrared image sensor; and the image information processing unit (CPU 15) configured to acquire information on an image of the imaging target region irradiated with the infrared light from the light source and information on an image of the imaging target region not irradiated with the infrared light from the light source, and generate information on an emphasis image in which an image of the gas in the image is emphasized with reference to the information on the image having been acquired. According to the first aspect, it is possible to provide a gas detection system that has high durability and achieves gas detection less susceptible to a surrounding environment.

In the gas detection system in a second aspect of the present invention, in the first aspect, the light source may be a pulse light source or a continuous wave light source, and the optical system may include an illumination optical system configured to condense an image of infrared light from the light source in the imaging target region so as to form an image with a dot array shape. This configuration is more effective from the viewpoint of downsizing of the device and the system.

In the gas detection system according to a third aspect of the present invention, in the first or second aspect, the optical system may be a diffractive optical element or a meta-surface, and may be arranged on an optical path of emitted light from the light source to the imaging target region or of incident light from the imaging target region to the infrared image sensor. This configuration is more effective from the viewpoint of downsizing of the device and the system.

In the gas detection system according to a fourth aspect of the present invention, in the third aspect, the optical system may be a meta-surface. This configuration is more effective from the viewpoint of downsizing of the device and the system, detection of the gas with high sensitivity, and enhancement of the detection limit of the gas.

In the gas detection system according to a fifth aspect of the present invention, in the third or fourth aspect, the optical system may be arranged on an optical path of emitted light from the light source to the imaging target region. This configuration is more effective from the viewpoint of downsizing the device and the system by downsizing of the light source.

The gas detection device (1) according to a sixth aspect of the present invention includes: the gas detection system of any one of the first to fifth aspects; and the display unit (20) configured to display an emphasis image. According to a sixth aspect, it is possible to provide a gas detection device that has high durability, can be downsized, and achieves gas detection less susceptible to a surrounding environment.

The gas detection device (1) according to the sixth aspect of the present invention includes: the gas detection system of any one of the first to fifth aspects; and the transmission unit (30) configured to transmit information on the emphasis image. According to a seventh aspect, it is possible to provide a gas detection device that has high durability, can be downsized, and achieves gas detection less susceptible to a surrounding environment. In addition, the present aspect is suitable for application to unmanned work for which no worker is required.

According to the present invention, it is possible to clearly detect leakage of a gas having a large influence on the environment such as a greenhouse gas. This is expected to contribute to the achievement of sustainable development goals for securing such gas consumption or production patterns and sustainable development goals (SDGs) for countermeasures against climate change.

What is claimed is:
1. A gas detection system comprising:
an infrared image sensor configured to image an imaging target region in which gas may be leaking;
a light source configured to irradiate the imaging target region with infrared light including an absorption wavelength of the gas;

an optical system configured to condense infrared light from the light source on a light receiving surface of the infrared image sensor; and an image information processing unit configured to acquire information on an image of the imaging target region irradiated with the infrared light from the light source and information on an image of the imaging target region not irradiated with the infrared light from the light source, and generate information on an emphasis image in which an image of the gas in the image is emphasized with reference to the information on the image having been acquired, wherein the light source is a pulse light source or a continuous wave light source, and the optical system includes an illumination optical system configured to condense an image of infrared light from the light source in the imaging target region so as to form an image with a dot array shape.

2. The gas detection system according to claim 1, wherein the optical system is a diffractive optical element or a meta-surface, and is arranged on an optical path of emitted light from the light source to the imaging target region or of incident light from the imaging target region to the infrared image sensor.

3. The gas detection system according to claim 2, wherein the optical system is arranged on the optical path of the emitted light from the light source to the imaging target region.

4. A gas detection device comprising: the gas detection system according to claim 1; and a display unit configured to display the emphasis image.

5. A gas detection device comprising: the gas detection system according to claim 1; and a transmission unit configured to transmit information on the emphasis image.

6. A gas detection system comprising:

an infrared image sensor configured to image an imaging target region in which gas may be leaking;

a light source configured to irradiate the imaging target region with infrared light including an absorption wavelength of the gas;

an optical system configured to condense infrared light from the light source on a light receiving surface of the infrared image sensor; and an image information processing unit configured to acquire information on an image of the imaging target region irradiated with the infrared light from the light source and information on an image of the imaging target region not irradiated with the infrared light from the light source, and generate information on an emphasis image in which an image of the gas in the image is emphasized with reference to the information on the image having been acquired, wherein the optical system is a meta-surface and is arranged on an optical path of emitted light from the light source to the imaging target region or of incident light from the imaging target region to the infrared image sensor.

* * * * *